E. B. WILLIAMSON.
BUNDLING DEVICE FOR LUMBER TRIMMING MACHINES AND THE LIKE.
APPLICATION FILED AUG. 25, 1917.
1,253,447.
Patented Jan. 15, 1918.
3 SHEETS—SHEET 1.
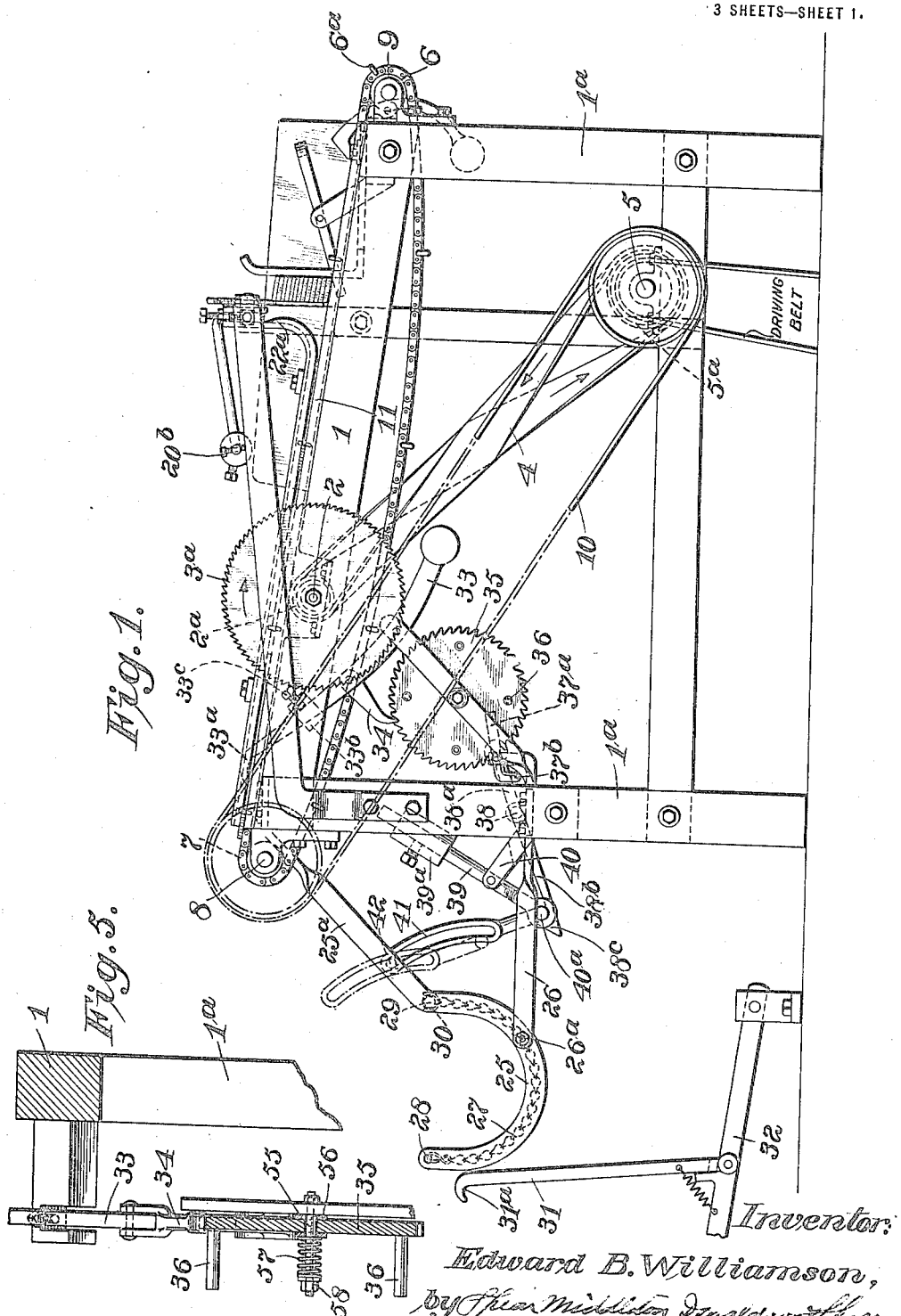
Inventor:
Edward B. Williamson,
by [signature] Attys.

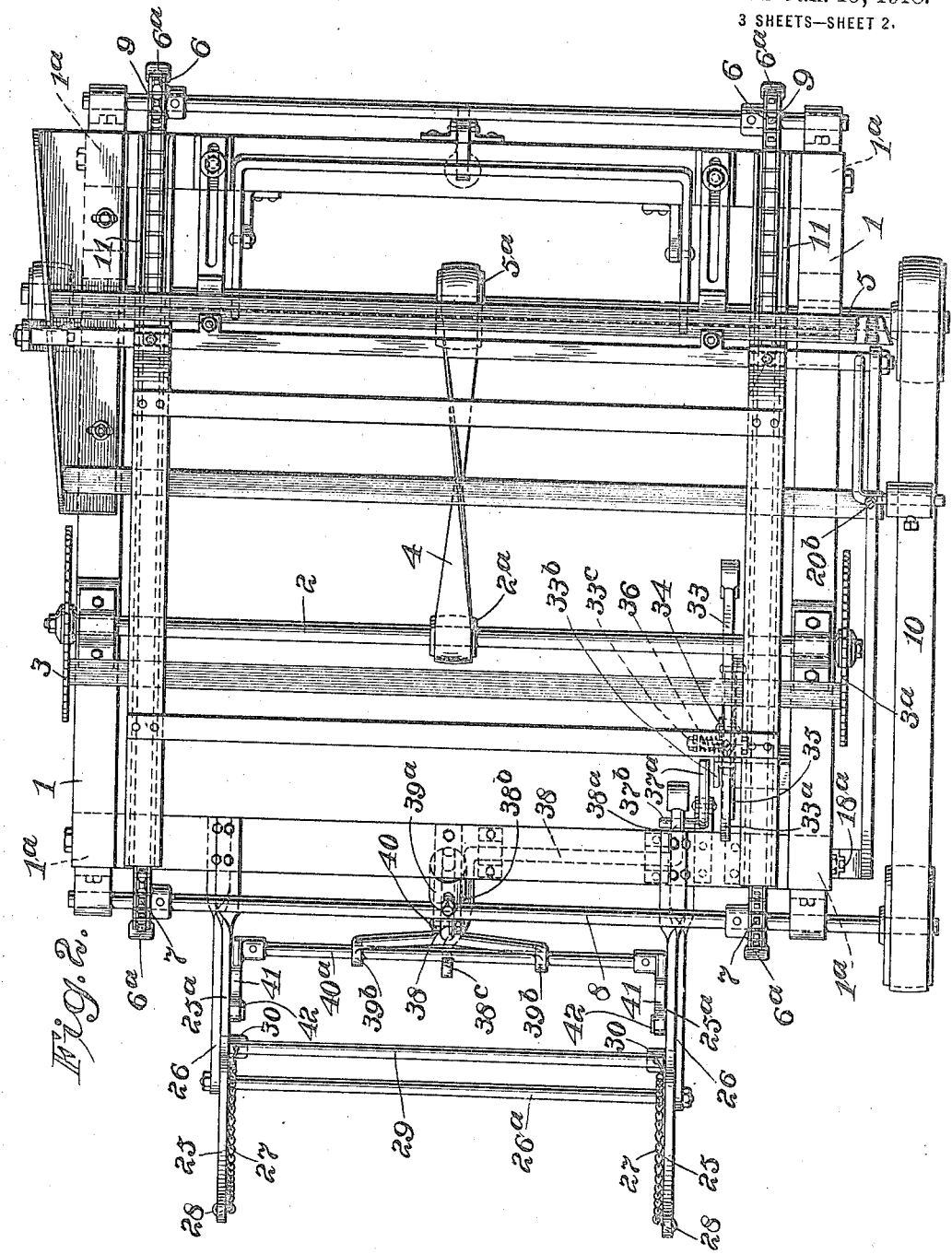

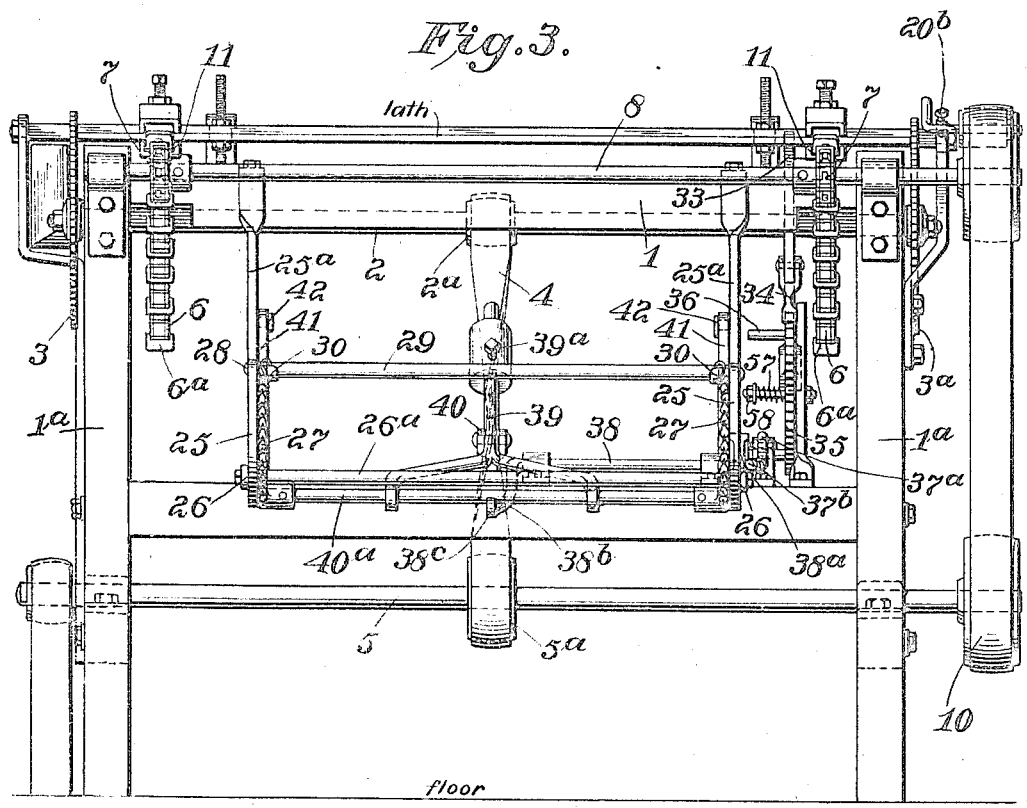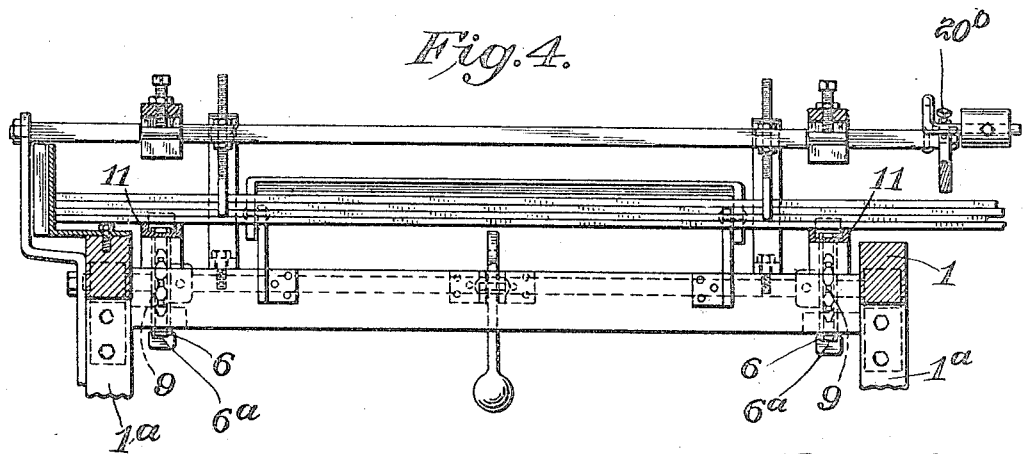

UNITED STATES PATENT OFFICE.

EDWARD BLAND WILLIAMSON, OF RICHMOND, VIRGINIA.

BUNDLING DEVICE FOR LUMBER-TRIMMING MACHINES AND THE LIKE.

1,253,447.          Specification of Letters Patent.       Patented Jan. 15, 1918.

Application filed August 25, 1917.  Serial No. 188,192.

*To all whom it may concern:*

Be it known that I, EDWARD B. WILLIAMSON, a citizen of the United States, and resident of Richmond, Virginia, have invented certain new and useful Improvements in Bundling Devices for Lumber-Trimming Machines and the like, of which the following is a specification.

My present invention relates to improvements in bundling devices for lumber trimming machines for trimming the ends of pickets, laths, copper sticks and the like, and aims to produce a simple, economical, durable and efficient machine possessed of various features of novelty and utility as will hereinafter appear.

My said invention is defined by the appended claims and an embodiment thereof is illustrated in the accompanying drawings, in which—

Figure 1 is a side elevation of the machine.

Fig. 2 is a plan view.

Fig. 3 is a rear elevation.

Fig. 4 is a detail elevation, partly in section, and

Fig. 5 is a sectional detail.

Referring by reference characters to these drawings, the numeral 1 designates a suitable frame supported by standards $1^a$, which frame supports, in suitable bearings, a saw carrying shaft 2 provided with a pair of circular saws 3 and $3^a$ located a distance apart corresponding to the length of the picket, lath, or other article to be trimmed. This shaft may be driven in any suitable manner, conveniently by a belt 4 passing over a pulley $2^a$ on shaft 2 and over a pulley $5^a$ on main drive shaft 5 which may receive its motion from any suitable prime mover.

The articles to be trimmed are successively fed from a supply at the front of the machine by endless chains or conveyers 6 which pass around driving sprockets 7 fast on a shaft 8 at the rear of the machine frame, and around idle sprockets 9 at the front. Shaft 8 may conveniently be driven by belt 10 from the main drive shaft 5. The endless chains or conveyers are provided with projections or flights $6^a$ designed to successively engage the lowermost pickets or strips of the pile at the front of the machine and to convey them past the saws, and during such conveying action the chains are guided in trough or channel shaped members 11, the flights projecting sufficiently above the edges of the guides to engage the strips.

The trimmed articles are deposited into a receptacle at the rear of the machine which is preferably formed of U-shaped bars 25 carried by or formed integral with bracket irons $25^a$ secured to the frame work of the machine at the rear end, which bracket irons are inclined so as to cause the trimmed articles to be deflected downwardly into the U-shaped arms. Additional supporting and bracing brackets 26 may be provided, as also the cross bar $26^a$.

These U-shaped arms carry a pair of chains 27 suitably connected to the rear ends of the arms at 28, the opposite ends of the chains being connected to a rod 29 designed to be supported by recessed lugs 30. These chains are for the purpose of compressing the strips into firm bundles preparatory to their being tied together by the operator and this is accomplished, after the requisite number of articles have been dropped into the U-shaped arms by the operator drawing the rod 29 across over the top of the assembled strips and engaging the same with the hook $31^a$ of a rod 31 pivotally connected to a foot lever 32. After such engagement of the central portion of the rod 29 with the hook 31, the foot lever may be depressed to tighten the chains about the assembled strips, the operator's hands being left free to pass the cord about the bundle and secure it around the same.

It is desirable that means be provided for automatically cutting off the supply of articles to the bundling device after a predetermined number has been accumulated therein and without stopping the machine, and for this purpose I provide a lever 33 suitably pivoted in the frame of the machine and having an end $33^a$ projected upwardly into position to be struck and depressed by the articles as they are fed rearwardly by the conveyer chains. This lever 33 carries a pawl 34 acting to turn a ratchet wheel 35 step by step. Means to limit the upward position of the lever 33 are provided in the shape of a grooved guide block $33^b$ mounted on the frame and carrying a set screw $33^c$ which regulates the position of the lever 33. Ratchet wheel 35 is provided with a plurality of holes adapted to receive one or more pins 36. These pins are adapted to strike one arm $37^a$ of a pivoted lever, the other arm 37ᵇ of which rests beneath the rear arm 38ᵃ of a rock shaft 38, which has an arm 38ᵇ provided with a hook 38ᶜ. A lever 39 is pivotally supported from a bracket 40 and carries a counter-weight 39ᵃ at one end, and a forked portion at its opposite end in which is mounted a rod 40ᵃ. To the ends of this rod 40ᵃ are connected arms 41 which have slotted portions slidably guided by pins 42 secured to the brackets 25ᵃ. After a certain number of strips or articles have accumulated in the U-shaped arms 25 one of the pins 36 will contact with arm 37ᵃ which will disengage the hook 38ᶜ from the rod carrying the arms 41 and allow these arms to be projected upwardly into the position in dotted lines in Fig. 1 by the action of the counter-weight 39ᵃ. This will obstruct the passage of the articles down the inclined brackets 25ᵃ for a sufficient period of time to enable the operator to bundle the previously assembled articles and remove them from the receiver and replace the chains, whereupon the operator will reset the parts.

In order that the receiver may be at the proper height to enable the operator to conveniently bundle the articles without causing too great an elevation at the front of the machine, I cause the conveyers to travel upwardly in an inclined path toward the rear of the machine, as shown in Fig. 1.

It will be obvious that the machine may be set to effect the delivery of any predetermined number of articles into the receiving arms. For instance, if the ratchet wheel 35 be provided with one hundred teeth and one pin be used one hundred articles would be delivered into the receiving arms before the delivery was interrupted, while if two diametrically opposed pins were used only fifty would be delivered prior to such interruption and so on.

To prevent the latch wheel 35 from moving backwardly on the return movement of the pawl 34, I prefer to mount it in the manner shown more in detail in Fig. 5, by reference to which it will be seen that the ratchet wheel is journaled on the pin 55 between two friction disks or washers 56, which are pressed toward each other by spring 57, the tension of which may be varied by the nut 58. This construction not only prevents any backward movement of the ratchet wheel but prevents any possibility of any excess movement or overthrow under the action of the pawl.

Having thus described my invention what I claim is:

1. In a device of the class described the combination with an endless conveyer for articles, a receiver at the rear end of the machine, and inclined members for delivering said articles from the conveyers to the receiver, of means for interrupting the delivery of strips to said receiver comprising a pair of arms guided to move transversely of said inclined members, a weighted lever connected to project said arms, a retaining device for holding said arms retracted, and means operated by the passage of a predetermined number of strips for automatically operating said retaining device.

2. In combination, an endless conveyer for articles, a receiver into which said articles are delivered, flexible compressing means permanently connected to one side of said receiver and detachably connected with the other side and means adapted to be connected with the detachable ends of said flexible elements for tightening them around the assembled strips.

3. In combination, an endless conveyer for articles, a receiver into which said articles are delivered comprising U-shaped bars, chains each having one end connected to one end of a U-shaped bar, a rod connected to the other ends of said chains, means for supporting said rod to hold the chains in strip receiving position, a foot treadle, and means connected with said foot treadle and adapted to engage said rod.

In testimony whereof, I affix my signature.

EDWARD BLAND WILLIAMSON.

Copies of this patent may be obtained for five cents each, by addressing the "Commissioner of Patents, Washington, D. C."